United States Patent

Shimony et al.

[11] Patent Number: 5,898,669
[45] Date of Patent: Apr. 27, 1999

[54] ATM TRAFFIC MANAGEMENT DEVICE

[76] Inventors: Ilan Shimony, 7 Rehovot-Hanahar Street, Ramat Gan, 52531; Zvika Bronstein, 5a George-Elliot Street, Tel Aviv; Eytan Mann, 42 Sharira Street, Rishon Lezion; Avinoam Rubinstain, 744 Nahal-Kishon Street, Macabim; Gennady Dosovitsky, 7 Reuven and Bat-Sheva Street, Rishon Lezion; Eldad Bar-Eli, 20 Massada Street, Ramat Hasharon, all of Israel

[21] Appl. No.: 08/621,055

[22] Filed: Mar. 22, 1996

[51] Int. Cl.⁶ ....................................................... H04J 3/14
[52] U.S. Cl. ..................... 370/232; 370/236; 370/253; 370/419; 370/432; 370/463
[58] Field of Search ..................... 370/229–232, 370/235–237, 249, 252, 253, 389, 390, 395–399, 400, 409, 419, 420, 428, 463, 469, 432

[56] References Cited

U.S. PATENT DOCUMENTS

| 5,274,643 | 12/1993 | Fisk | 370/409 |
|---|---|---|---|
| 5,442,624 | 8/1995 | Bonomi et al. | 70/231 |
| 5,446,726 | 8/1995 | Rostoker et al. | 370/253 |
| 5,515,359 | 5/1996 | Zheng | 370/232 |
| 5,515,363 | 5/1996 | Ben-Nun et al. | 370/232 |
| 5,684,800 | 11/1997 | Dobbins et al. | 370/469 |
| 5,694,390 | 12/1997 | Yamoto et al. | 370/232 |
| 5,701,291 | 12/1997 | Roberts | 370/232 |

*Primary Examiner*—Douglas W. Olms
*Assistant Examiner*—Seema S. Rao

*Attorney, Agent, or Firm*—Wilson Sonsini Goodrich & Rosati

[57] ABSTRACT

A traffic management unit for implementing Traffic Management (TM) of Available Bit Rate (ABR) traffic on an Asynchronous Transfer Mode (ATM) network is described. The traffic management unit comprises a traffic management processor coupled to a traffic management memory. The traffic management processor is coupled between a data processor and an ATM interface. An Ethernet workstation is coupled to the data processor through an Ethernet interface. An ATM switch is coupled to the traffic management processor through the ATM interface. The traffic management unit is implemented as a unit separate from the cell scheduling data processor. In addition, in order to utilize network congestion information more efficiently, VCs are grouped according to their output destinations or their path through the network. Congestion feedback for one VC is applied to other VCs within the group. The traffic management startup procedure is streamlined by using a preliminary profile and modifying this preliminary profile in accordance with feedback congestion data received. TM can be disabled for destination end stations not implementing TM. To further streamline the traffic management processes, memory based rate lookup tables containing pre-calculated profile sets are utilized. Each VC uses one of these tables thus obviating the need for time and hardware intensive multiplications and additions. In addition, the traffic management unit implements multicast domain shaping by mapping destination data multicast addresses and protocol types, found in input frames or packets, into destination VCs, thus eliminating the wasteful listen and discard processes associated with broadcast characteristic of Ethernet.

6 Claims, 6 Drawing Sheets

ATM TRAFFIC MANAGEMENT DEVICE

FIELD OF THE INVENTION

The present invention relates to Asynchronous Mode Transfer (ATM) networking and in particular to ATM traffic management.

BACKGROUND OF THE INVENTION

ATM originated as a telecommunication concept defined by the Comité Consulatif International Télégraphique et Téléphonique (CCITT), now known as the International Telecommunications Union (ITU), and the American National Standards Institute (ANSI) for carrying user traffic on any User to Network Interface (UNI) and to facilitate multimedia networking between high speed devices as multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables dedicated bandwidth for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multiprotocol transmissions. Since ATM is protocol transparent, the various protocols can be transported at the same time. With ATM, phone, fax, video, data and other information can be transported simultaneously.

The components of the ATM header consist of the following fields. A generic flow control (GFC) field provides flow control; a virtual path identifier (VPI)/virtual channel identifier (VCI) field allows the network to associate a given cell with a given connection; a payload type identifier (PTI) field indicates whether the cell contains user information or management related data and is also used to indicate a network congestion state or for resource management (i.e., the EFCI bit which is part of the PTI field); a cell loss priority (CLP) field indicates that cells with this bit set should be discarded before cells with the CLP bit clear; a header error check (HEC) field is used by the physical layer for detection and correction of bit errors in the cell header and is used for cell delineation.

The provisioning of an ATM network connection may include the specification of a particular class of service. The following list the various classes of service currently defined in ATM. Constant bit rate (CBR) defines a constant cell rate and is used for emulating circuit switching (e.g., telephone, video conferencing, television, etc.). Variable bit rate (VBR) allows cells to be sent at a variable bit rate. Real-time VBR can be used for interactive compressed video and non real-time can be used for multimedia e-mail.

Available bit rate (ABR) is designed for data traffic (e.g., file transfer traffic, etc.) and is the class service connected with resource management. The source is required to control its rate depending on the congestion state of the network. The users are allowed to declare a minimum cell rate, which is guaranteed to the virtual circuit by the network. ABR traffic responds to congestion feedback from the network.

ABR is implemented by both switches and end stations in the network. Binary switches monitor their queue lengths, set the bit in the cell headers, but do not deal with the computation of explicit rate feedback when congestion occurs.

Explicit rate switches compute the rate at which a source end station can transmit and place this information in the explicit rate field in the returning resource management cell. The destination sends one resource management cell for every N data cells transmitted. If the source does not receive a returning resource management cell, it decreases its allowed cell rate. This results in the source automatically reducing its rate in cases of extreme congestion.

In the case when the source receives a resource management cell, it checks the congestion indication flag, after which the sending rate may be increased. If the flag is set, then the sending rate must be reduced. After this stage, the rate is set to the minimum of the above and the explicit rate field.

A fourth class of service, unspecified bit rate (UBR), is utilized by data applications that are not sensitive to cell loss or delay and want to use leftover capacity. During congestion, the cells are lost but the sources are not expected to reduce their cell rate.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Traffic Management

Traffic management (TM) can be defined as the process by which the flow of cells from one device to another within the ATM network is controlled in order to allow for the greatest possible flow rate for the longest possible periods of time. ATM network congestion is defined as a state of network elements (e.g., switches, concentrators, etc.) in which the network is not able to meet the negotiated network performance objectives for the already established connections, resulting in lost cells. ATM layer congestion can be caused by unpredictable statistical fluctuation of traffic flows or fault conditions within the network. The purpose of traffic management is to ensure that users get their desired quality of service. During periods of heavy loads, when traffic cannot be predicted in advance, ensuring quality of service presents a problem. This is the reason congestion control is the most essential aspect of traffic management.

Traffic management refers to the set of actions taken by the network to avoid congested conditions. Congestion control refers to the set of actions taken by the network to minimize the intensity, spread and duration of congestion. These actions are triggered by congestion in one or more network elements. In general, the following traffic and congestion control functions are available within ATM networking.

The ATM standard defines a standard mechanism for the ATM network for indicating congestion states (e.g., setting the EFCI bit in the cell header) and for indicating cell loss priority for selecting which cell to drop first in case congestion exists. Explicit forward congestion indication (EFCI) is a congestion notification mechanism that the ATM layer service user may make use of to improve the utility that can be derived from the ATM layer. A network element sets the EFCI bit in the cell header in an impending congested or already congested state. A congested network element can selectively discard cells explicitly identified as belonging to a non-compliant ATM connection and/or those cells with their CLP bit set. This is to protect cells without their CLP bit cleared from being discarded for as long as possible.

Figure 1:
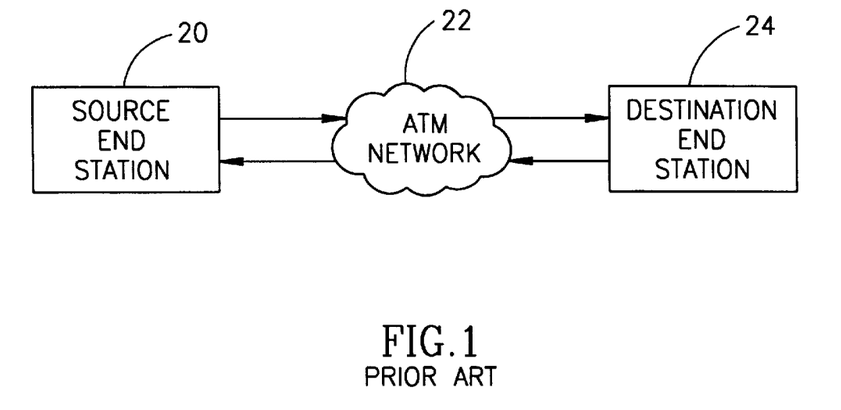
FIG. 1 illustrates an example ATM network including a source end station and a destination end station coupled together by an ATM network.

For ABR traffic, the ATM forum has defined a traffic management scheme that uses Resource Management (RM) cells to control the traffic rate through the network based in part on the EFCI mechanism defined previously. With reference to FIG. 1, a source end station (SES) 20 inserts forward RM cells into the ATM network 22. The destination end station (DES) 24, upon receiving these forward RM cells, turns them around and sends them back as backward RM cells.

Implicit Rate ABR

In prior art implicit rate control, if there has been congestion on the forward path (recognized at the DES (FIG. 1) by the EFCI bits of the incoming data cells), a congestion field in the backward RM cell is marked (i.e. set to a '1'). The SES 20 receives the backward RM cell and acts upon it. If the congestion field indicates a congestion or if the RM cell is not returned, the sending rate is reduced. When the SES 20 receives a backward RM cell with the congestion field not indicating a congestion, it may increase the sending rate on that particular virtual circuit (VC).

Explicit Rate ABR

Explicit rate control enhances the implicit rate control by adding an explicit rate field to the RM cell. In this field, the SES indicates the rate at which it would like to transmit. If an explicit rate switch exists in the VC route it may reduce the value in the explicit rate field in the backward RM cells in case of congestion. In this case (the example in FIG. 1) explicit rate for the SES is indicated. The SES upon receiving the RM cells, adjusts its sending rate according to the explicit rate fields.

Figure 2:
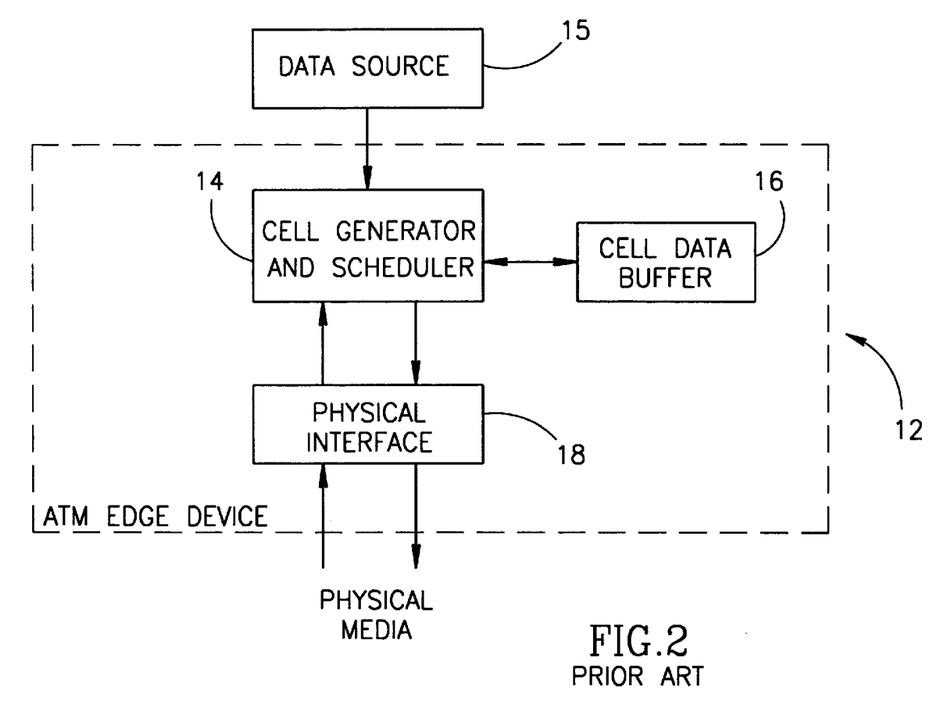
FIG. 2 is a high level block diagram illustrating a prior art ATM edge device including a cell scheduler coupled to a physical interface and a cell data buffer.

A high level block diagram of a portion of a typical ATM edge device 12 (i.e. a device that resides on the outer border of an ATM network) is illustrated in FIG. 2. A data source 15 is shown coupled to a cell generator and scheduler 14 which, in turn, is coupled to a cell data buffer 16 and a physical interface 18. Data source 15 may be any device or system that supplies data to be transported over the physical media, e.g., Token Ring, Ethernet, video conferencing, etc. The function of physical interface 18 is to couple transmit and receive data from the physical media to cell generator and scheduler 14. Cell data buffer 16 functions as a temporary holding memory until cell generator and scheduler 14 has finished processing cells.

Figure 3:
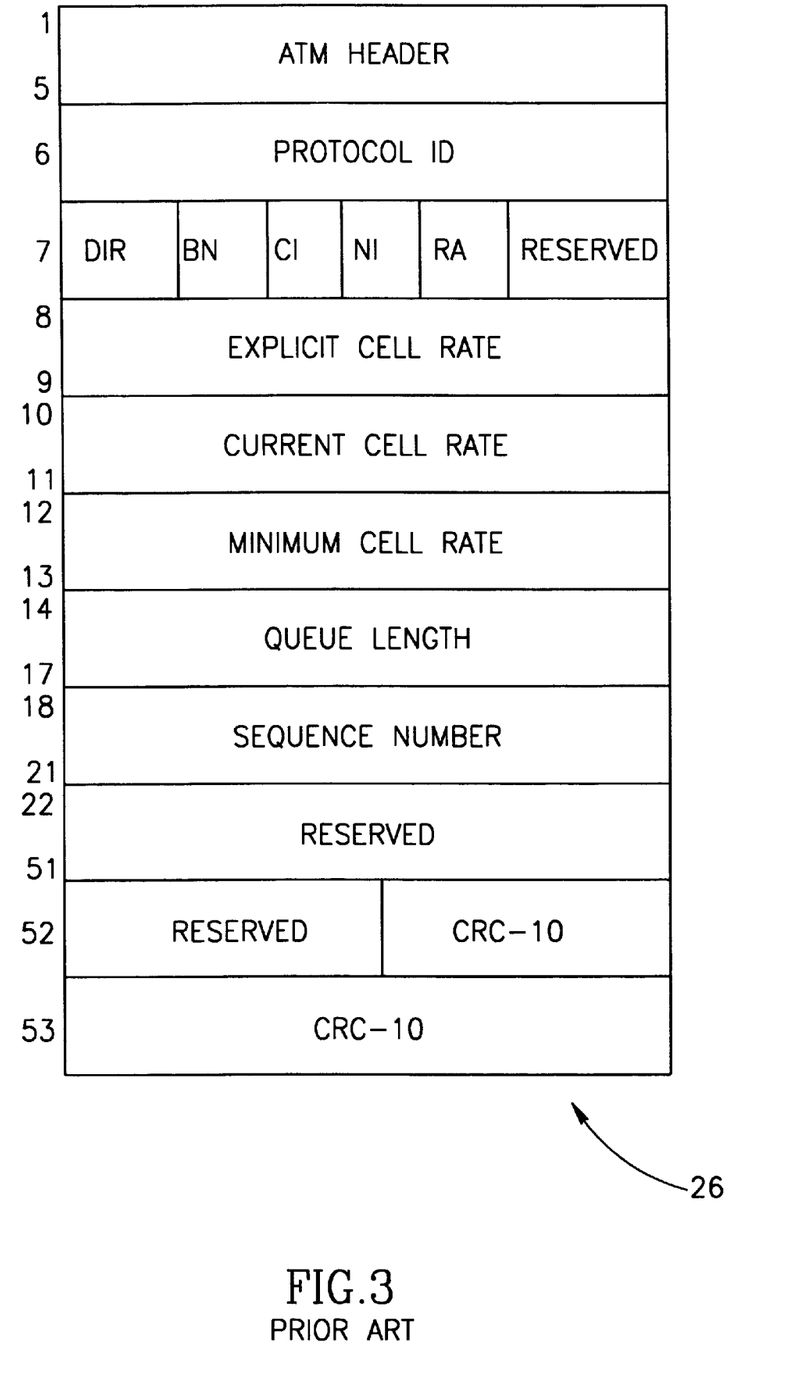
FIG. 3 is a high level diagram illustrating the Resource Management (RM) cell format.

The cell format of a standard RM cell is illustrated in FIG. 3. The cell format is shown in increasing byte order starting with byte number one. The ATM header comprises bytes 1–5. The protocol ID comprises byte 6. Byte 7 comprises a direction (DR) bit (forward=0, backward=1), a BECN cell indicator (a 1 if switch generated), a congestion indication (CI) bit (a 1 if congestion present), a no increase (NI) bit (a 1 means do not increase rate), a request acknowledge (RA) bit and a 3 bit reserved field. The explicit cell rate (ER) comprises bytes 8–9. Bytes 10–11 comprise the current cell rate (CCR). Bytes 12—13 comprise the minimum cell rate (MCR). The queue length indicator (QL) comprises bytes 14–17. The sequence number (SN) (an integer number) comprises bytes 18–21. Bytes 22–51 and a portion of byte 52 are reserved. A CRC-10 field occupies the remainder of byte 52 and byte 53.

In order to implement traffic management functions and the handling of RM cells, the prior art approach is to modify cell scheduler 14 to include traffic management functions. The disadvantage of this approach is that this is usually a complex and expensive process. In addition, if traffic management functions are to be incorporated into other different cell schedulers, the process must be repeated for each one.

SUMMARY OF THE INVENTION

According, it is an object of the present invention to provide an improved traffic management device for an ATM edge device that overcomes the problems of the prior art and which is self contained and can be implemented in a single device.

It is also an object of the present invention to provide an improved traffic management device that can be implemented externally of the cell scheduler without requiring major modifications to existing cell schedulers.

Yet another object of the present invention is to provide a traffic management device that is table driven, flexible and generic.

It is also an object of the present invention to provide an improved traffic management device that has self-boot capabilities and incorporates a VC grouping mechanism.

Yet another object of the present invention is to provide a traffic management device that can provide multicast shaping.

Thus, there is provided in accordance with a preferred embodiment of the present invention a traffic management device coupled between a cell data processor, and an Asynchronous Transfer Mode (ATM) switch, the device comprising a traffic management processor coupled between the data processor and the ATM switch, the traffic management processor providing resource management functionality for traffic flow between a first network device coupled via the data processor and a second network device coupled to the ATM switch and a traffic management memory coupled to the traffic management processor, the traffic management memory storing a plurality of lookup tables related to resource management (RM).

In another preferred embodiment of the present invention, there is provided a traffic management unit coupled between a cell data processor, and an Asynchronous Transfer Mode (ATM) switch, the unit located in a first end station, the first end station communicating with a second end station, the first end station having a plurality of virtual circuits, each virtual circuit having a destination, the unit comprising means for generating and transmitting Resource Management (RM) cells from the first end station to the second end station, means for receiving and processing the RM cells returned from the second end station, a plurality of lookup tables for holding traffic management related fixed data, means for grouping virtual circuits originating in the first end station according to their destination and performing feedback and rate calculations on a virtual circuit basis, means for starting the traffic management unit in a predictable manner by employing a preliminary profile, means for utilizing the plurality of lookup tables in the traffic management unit so as to reduce processing time and increase cell throughput and means for shaping multicast domains wherein destination information located within data input to the unit is mapped to at least one virtual circuit.

In addition, the means for starting the traffic management unit in a predictable manner performs a method which includes the steps of booting the first end station utilizing a predetermined preliminary profile, transmitting at least one RM cell to the second end station, switching the first end station to use an operational profile if RM cells are returned to the first end station, turning traffic management functions off, including the generation of RM cells, if no RM cells are returned but data cells are received by the first end station and also including the step of terminating the communication between the first end station and the second end station if no RM cells are returned and no data cells are received by the first end station.

BRIEF DESCRIPTION OF THE DRAWINGS

The invention is herein described, by way of example only, with reference to the accompanying drawings, wherein.

DETAILED DESCRIPTION OF THE INVENTION

Block Diagram Description

Figure 4A:
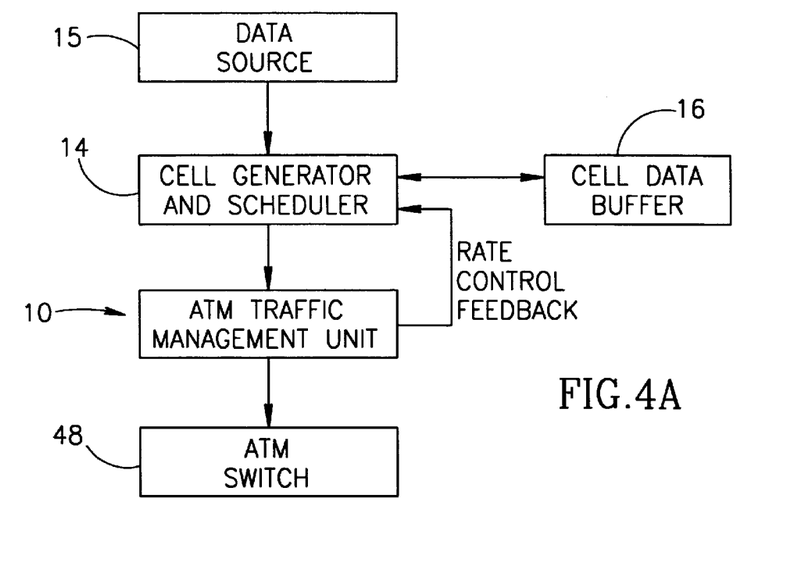
FIG. 4A is a high level block diagram illustrating a traffic management unit of the present invention as applied to a prior art ATM edge device.

A high level block diagram illustrating a traffic management unit, generally referenced 10, of the present invention as applied to a prior art ATM edge device is shown in FIG. 4A. As in the prior art device of FIG. 2, data source 15 is coupled to cell generator and scheduler 14. Cell data buffer is coupled to cell generator and scheduler 14. However, ATM traffic management unit 10 is coupled between cell generator and scheduler 14 and an ATM switch 48. As described in more detail below, ATM traffic management unit 10 performs all Resource Management tasks and functions to reduce network traffic congestion.

Figure 4B:
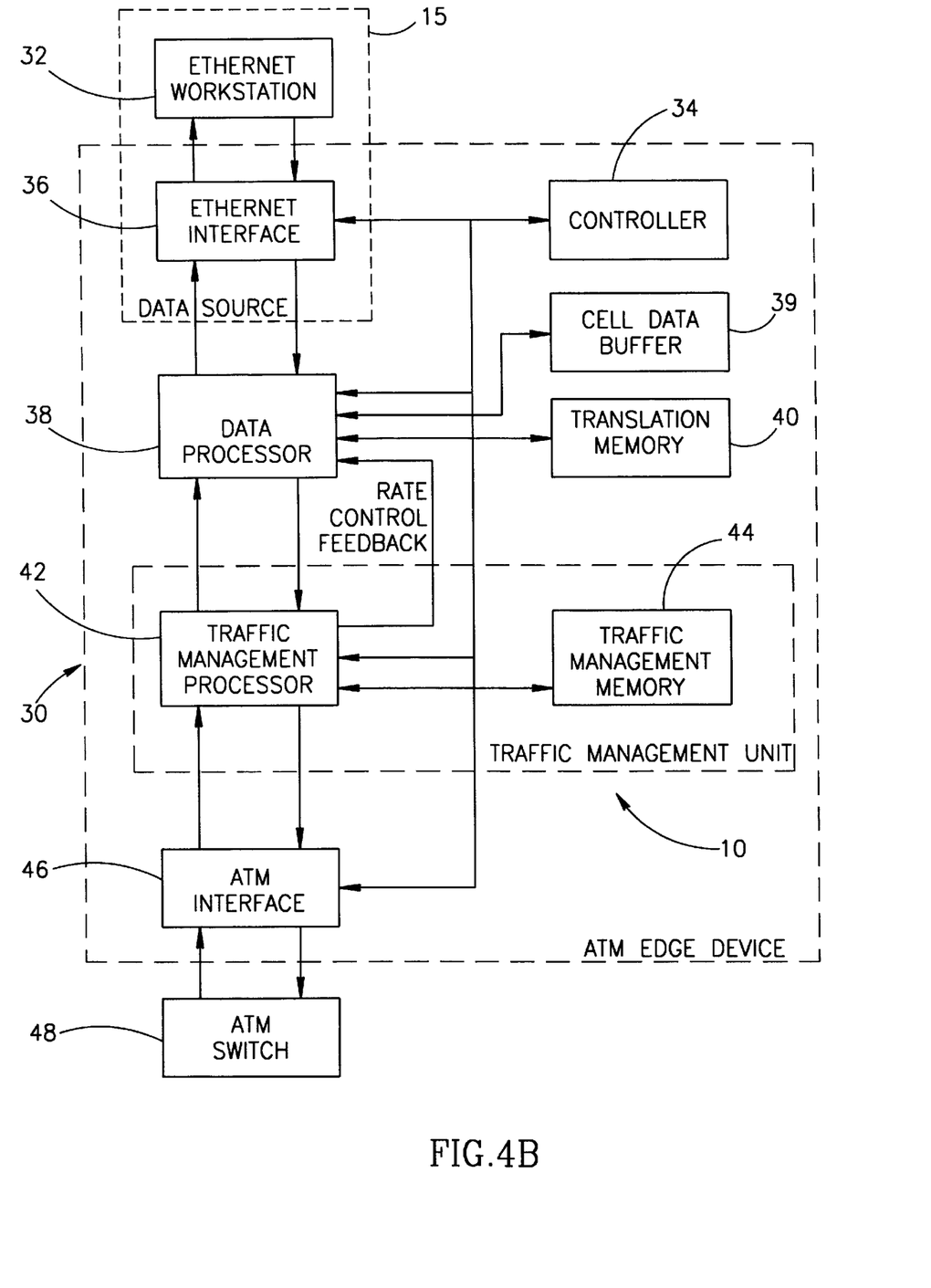
FIG. 4B is a high level block diagram illustrating a traffic management unit constructed in accordance with a preferred embodiment of the present invention and situated within an ATM edge device.

A high level block diagram illustrating traffic management unit 10 constructed in accordance with a preferred embodiment of the present invention situated within an ATM edge device 30 is shown in FIG. 4B. An Ethernet workstation 32 is shown coupled to ATM edge device 30 through Ethernet interface 36. Ethernet workstation 32 and Ethernet interface 36 are specific examples of data source 15. The present invention is not limited in any way to the sole use of an Ethernet device as the data source. The present invention will work with any other type of data source capable of outputting data, such as the data networks Token Ring and FDDI or local data sources such as video conferencing, computers, etc.

Also shown coupled to ATM edge device 30 is ATM switch 48 through an ATM interface 46. The transmit data flow path from ATM switch 48 to Ethernet workstation 32 is through ATM interface 46, traffic management unit 10, a data processor 38 and Ethernet interface 36. The receive data flow path from Ethernet workstation 32 to ATM switch 48 is exactly the opposite. Traffic management unit 10 comprises a traffic management processor 42 and a traffic management memory 44.

ATM edge device also comprises a translation memory 40 and a cell data buffer 39 both coupled to data processor 38. In addition, the ATM edge comprises a controller 34 coupled to Ethernet controller 36, data processor 38, traffic management processor 42 and ATM interface 46. A rate control feedback signal is generated by traffic management processor 42 and input to data processor 38.

Functional Description

The function of ATM edge device 30 is to allow Ethernet workstation 32 to communicate with ATM switch 48 and vice versa. Data packets transmitted by Ethernet workstation 32 are received by Ethernet interface 36 and input to data processor 38. Data processor 38 functions to reformat or repackage the Ethernet frame into standard ATM cell format. The repackaged data is then output by data processor 38 and normally would be input to ATM interface 46, which is coupled to ATM switch 48. However, in the present invention, the ATM cells output by data processor 38 are received by traffic management processor 42 within traffic management unit 10. Traffic management unit 10 functions to control the flow rate of cells into and out of ATM edge device 30 so as to allow for a maximum flow rate with minimal cell loss for as long as possible.

An advantage of traffic management unit 10 is that all RM cell processing and resource management is implemented in a separate unit rather than being integrated into cell scheduler 14 (FIG. 2). Using traffic management unit 10, changes can be made to traffic management algorithms and unit functionality without major redesign. This modular approach also allows a cost reduced version of ATM edge device 30 that lacks traffic management unit 10. The cell scheduling functionality remains in data processor 38, the difference being that data processor 38 receives a rate control signal from traffic management unit 10.

As previously disclosed, traffic management unit 10 comprises traffic management processor 42 and traffic management memory 44. Traffic management memory 44 functions to store various traffic management tables and other related statistics data.

During operation, Resource Management (RM) cells are used by the ATM network to control the data rate flow. RM cells are sent at regular intervals from ATM edge device 30 (i.e. source end station 20, FIG. 1) and make their way through ATM network 22. In the event a data cell encounters congestion in the forward direction from source to destination, its EFCI bit in the ATM header gets set by an ATM switch along the path. In response, the traffic management unit in the destination end station marks the congestion indicator (CI) bit in the next RM cell received. The RM cell is then returned to ATM edge device 30. In the event the RM cell is not returned to the source ATM edge device or the RM cell is returned but with its CI bit set, the traffic rate is automatically decreased. A received RM cell with the CI bit cleared enables the sending ATM edge device to increase its sending rate. Backward RM cells are RM cells generated and transmitted by the destination ATM edge device after receipt of the forward RM cell from the source ATM edge device.

Traffic management operates using both Explicit Forward Control Indication (EFCI) based flow control and Explicit Rate (ER) based flow control methods. Implicit traffic management refers to traffic management that checks the EFCI bit in the ATM cell header (not shown). When the network becomes congested, the ATM switch marks the EFCI bit to indicate the congested state and the source end station adjusts the flow rate accordingly. Explicit traffic management refers to traffic management that automatically sets the explicit flow rate in the RM cell. Traffic management, thus allows the network devices to transmit at higher rates with lower cell loss, making the network more efficient.

To illustrate the operation of implicit traffic management, a typical scenario is present with reference to FIG. 1. An RM cell is sent at regular intervals on each virtual circuit (VC) from source end station 20. The EFCI bit within the data cell is set by an ATM switch within ATM network 22 when congestion is found along the VC path. Destination end station 24 recognizes the EFCI bit and the RM cell CI bit is set. The RM cell is returned to source end station 20 through ATM network 22. VC traffic flow is altered based on information in the RM cell. The rate is automatically decreased if the RM cell is not returned to source end station 20.

Detailed Description of the Traffic Management Device

Figure 5:
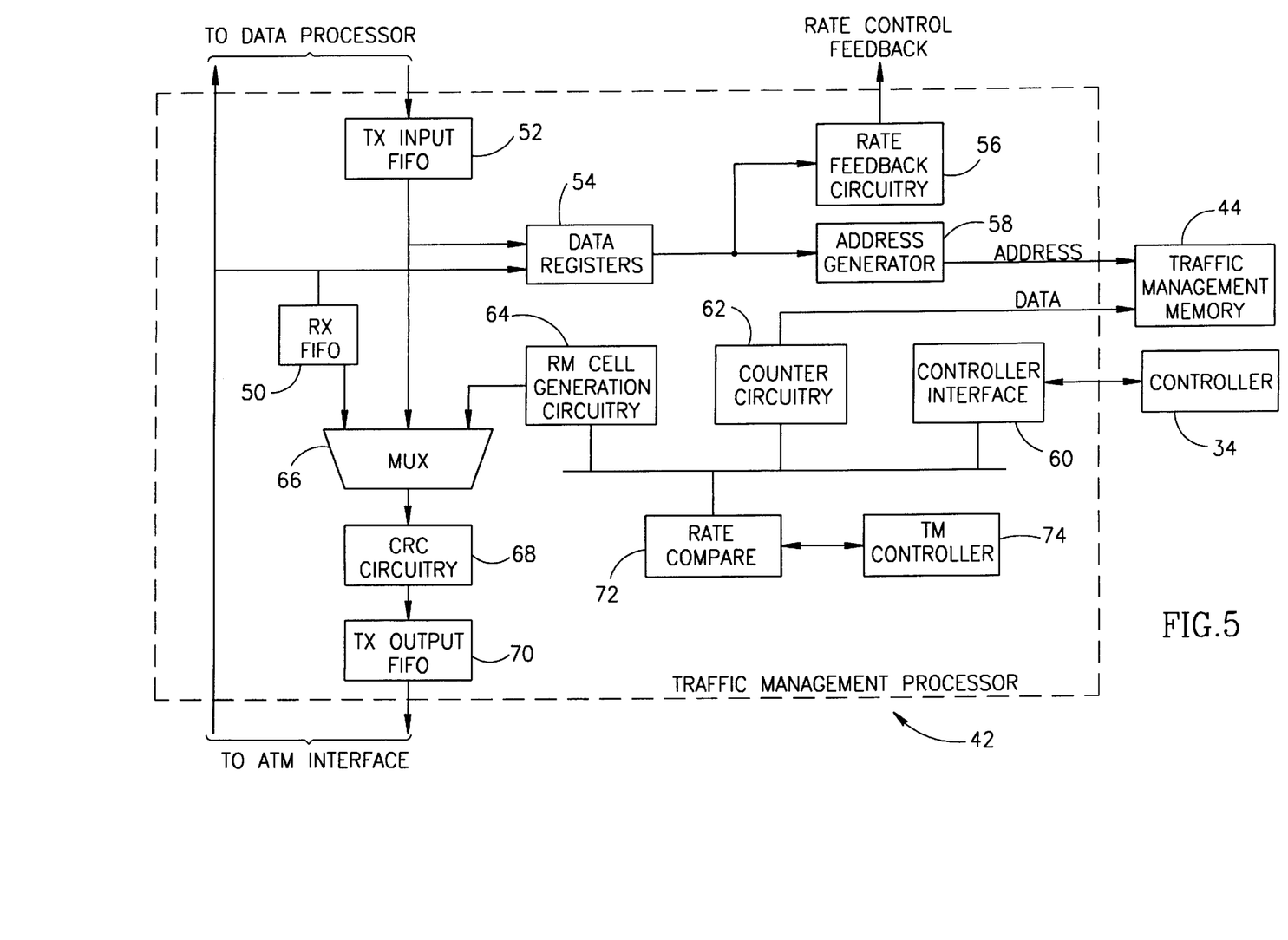
FIG. 5 is a detailed block diagram illustrating the traffic management processor portion of the traffic management unit.

Traffic management processor 42 will now be described in more detail. A detailed block diagram illustrating traffic management processor 42 of traffic management unit 10 is shown in FIG. 5. Data received from ATM interface 46 passes through to data processor 38, to receive FIFO 50 and to data registers 54. The output of receive FIFO 50 is input to multiplexor (mux) 66. Data from data processor 38 is input to a transmit input FIFO 52. The output of transmit input FIFO 52 is input to mux 66 and to data register 54. The output of data register 54 is input to rate feedback circuitry 56 and address generator 58. Rate feedback circuitry 56 generates the rate control feedback signal that is fed back to data processor 38 (FIG. 4). The output of address generator 58 is input to traffic management memory 44.

The output of RM cell generation circuitry 64 comprises a third input to mux 66. RM cell generation circuitry is also coupled to an internal bus. The bus couples together counter circuitry 62, a controller interface 60 and rate compare circuitry 72. Coupled to rate compare circuitry 72 is a traffic management (TM) controller 74 which oversees the operation of traffic management processor 42. Controller interface 60 is also coupled to controller 34 which oversees the operation of ATM edge device 30 (FIG. 4). The output of mux 66 is coupled to cyclic redundancy check (CRC) circuitry 68 which, in turn, is coupled to a transmit output FIFO 70. Counter circuitry 62 is also coupled to traffic management memory 44.

The operation of traffic management unit 10 describing the insertion of RM cells into the ATM data cell stream will now be described. As the data cell passes through traffic management processor 42, the VC field is retrieved from the data cell and stored temporarily in data register 54. Address generator 58 then calculates and generates an address based on the retrieved VC. A separate count is maintained in traffic management memory 44 of the number of data cells that pass through according to each VC. Once a predetermined threshold is reached, typically 32, RM cell generation circuitry 64 inserts an RM cell into the data stream. Using the VC information as an index, data from traffic management memory 44 is utilized in generating and inserting the RM cell.

The operation of traffic management unit 10 describing the reception of RM cells from the ATM data cell stream and subsequent loopback will now be described. There are two types of received RM cells. The first type is an RM cell that was originated by a remote source end station. The second type is an RM cell originated by traffic management unit 10 and looped back by a remote destination station. Both scenarios are described below.

As previously described, the RM cell is sent by a source end station. In the case of the first or forward type of RM cell, traffic management unit 10 receives the RM cell and loops it back with minor modification depending on the congestion conditions. Upon receipt of the RM cell originated by a remote source end station, traffic management processor 42 inserts congestion information into the RM cell. This is accomplished by setting or flipping the congestion bit and recalculating the CRC checksum and returning the RM cell to the originator.

Table Driven Operation

In the second or backward type of RM cell, traffic management unit 10 is the originator and the remote destination end station has received and looped back the RM cell. Upon receipt, the information contained in the RM cell is first extracted. The extracted information is used to index one or more translation look up tables (LUTs) containing data such as data rate control information. The current data rate information is analyzed with respect to the received congestion information and a decision is made as to whether to increase, decrease or keep constant the current data rate, utilizing increase and decrease data rate translation LUTs. Once it is decided to increase or decrease the current transmit data rate, a new rate is retrieved from the tables. The retrieved new data rate is compared with the explicit rate field in the RM cell and the minimum or lower data rate is actually used as the new data rate.

The use of look up tables offers greater flexibility, saves processing time and greatly increases the cell throughput rate for the same processing power while also simplifying the hardware. Implementing the TM standard requires numerous multiplications and additions which are expensive to implement in hardware. Rather than have the hardware calculate rates anew each time, in the present invention they are pre-calculated once to generate different profile sets, over different step sizes and rate values, which are then placed into memory LUTs which are indexed according to the current rate. Each VC uses one of the pre-calculated profile sets. The need for time intensive floating point calculations are thus eliminated and increasing or decreasing data rates is simply a matter of indexing the appropriate table with the appropriate value. Note, however, that utilizing tables lowers the number of possible rates, which is more restrictive than what is provided by the standard.

VC Grouping

In order to utilize network congestion information more efficiently, all VCs within ATM edge device 30 may be grouped by the user according to their output destinations (i.e. according to their path through the network). Congestion feedback and rate calculations are performed on a VC group basis rather than on a per VC basis. Normally, each VC has associated with it its own RM cell traffic. Since most VCs within a group travel on the same path, this process is not very efficient and is wasteful of network bandwidth. Rather than have separate RM cell traffic for each VC, after a predetermined idle period after a VC is initiated, the same group based rate information is used for all VCs within the same VC group. Feedback information obtained from one VC is utilized to determine the data rate for other VCs within the same group. Thus, if the group path through the network is congested then the newly initiated VC starts at a lower rate, since it uses feedback information from VCs initiated earlier. Conversely, if the group path is clear, then the VC can start at a higher rate than normal. In addition, if the network is congested, the lower rate helps to protect the ATM network from further congestion and cell loss.

Figure 6:
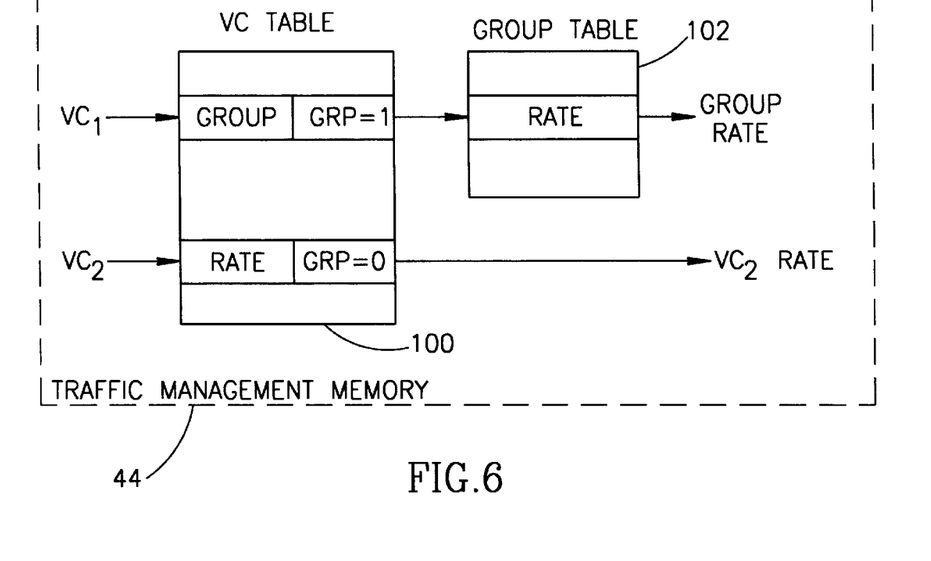
FIG. 6 is a high level block diagram illustrating the VC grouping of data rates within the data rate translation tables.

An illustration of the technique described above is illustrated in FIG. 6. Numerous lookup tables are maintained within traffic management memory 44. A VC Table 100 and a Group Table 102 are two such tables, for example. Each record in the VC Table has a GRP field which indicates whether the VC rate information is being grouped or not for all VCs within the group. A '1' indicates grouping and a '0' indicates no grouping. Thus, if grouping is turned on, the rate field contains a group ID rather than rate data. For example, $VC_1$ points to a group ID which, in turn, points to a rate entry for the entire group within the Group Table. On the other hand, $VC_2$, for example, points to an actual rate value in the VC Table.

TM Startup Algorithm

The traffic management startup algorithm will now be described in more detail. TM is started only when the destination end station is also TM compliant, otherwise the data rate will drop as RM cells fail to return. The method disclosed herein is simpler than the method contained in the standard proposed signaling. In light of the numerous parameters connected with TM, it is desirable to start the operation of traffic management unit 10 in a semi-known or predictable manner. To achieve this, traffic management unit 10 is booted in a distributed fashion without using any complicated signaling procedures. As discussed previously, TM requires processes to be running on both source and destination end stations. The source end station process generates RM cells and responds to RM cells originated by the destination end station. The destination end station loops back RM cells to the source end station.

Figure 7:
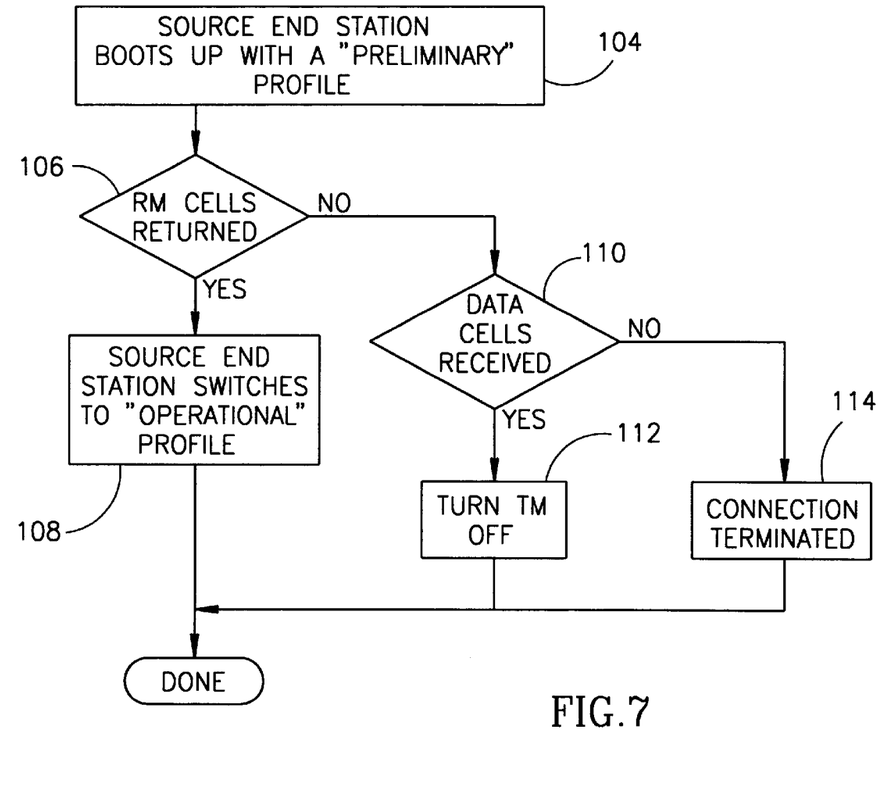
FIG. 7 is a high level flow diagram illustrating the traffic management startup procedure.

The traffic management startup procedure is described as follows with reference to FIG. 7. The source end station always boots up or starts up using a 'preliminary' profile (step 104). This preliminary profile has a pre-selected data rate which includes a 'no rate change' rate profile. Thus, no matter what feedback arrives from the network, the transmit data rate is not changed. After a predetermined time period, the TM counters (FIG. 5) are checked for returning RM cells (step 106). If RM cells were looped back by the destination end station, it means that the destination TM process is up and running. The source end station then changes its profile to 'operational,' which manages the source transmit data rate according to network conditions and the traffic management process within the source end station (step 108). If no RM cells are returned after a predetermined period of time, then either the destination end station is down, it does not support TM or network congestion is present. Thus, it is then checked whether data cells are being received (step 110). If they are, it means that the destination end station does not support TM and, consequently, the TM procedure within the source end station is turned off (step 112). If data cells are also not received then the connection is terminated by other protocols within the source end station (step 114).

Process Flow Description

Figure 8:
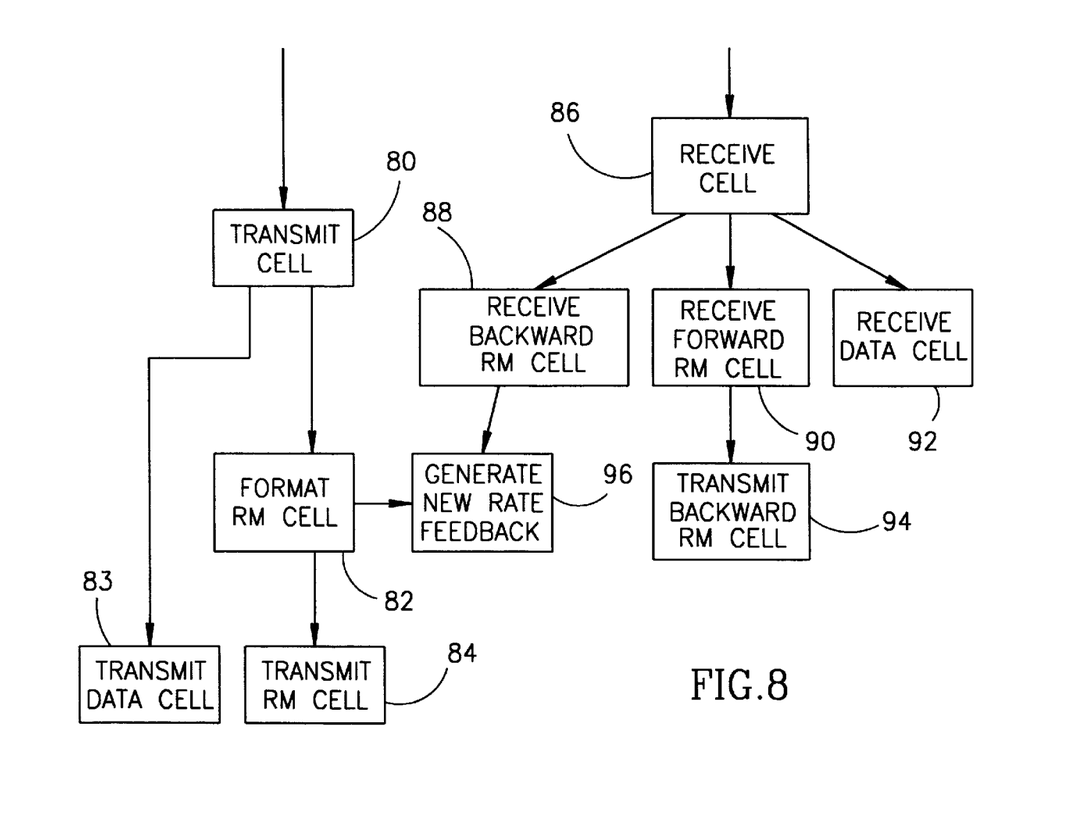
FIG. 8 is a high level control flow diagram illustrating the internal processing of the traffic management unit.

A high level control flow diagram illustrating a portion of the internal processing of traffic management unit 10 is shown in FIG. 8. Transmit cell process 80 includes formatting RM cell process 82 and transmitting RM cell process 84 wherein an RM cell is sent to the destination end station. A transmit data cell process 83 controls the transmission of regular data cells. The format RM cell process 82 also transmits new data rate feedback data to generate new rate feedback process 96. Generate new rate feedback process 96 is responsible for feeding back a new data feedback rate to data processor 38 (FIG. 4). The receive cell process 86 can either receive backward RM cells 88, receive forwarded RM cells 90 or receive a data cell 92. Receive back RM cell process 88 receives and processes returning RM cells initiated by traffic management unit 10 itself. Depending on the received data in the RM cell, new data rate feedback data might be specified and passed to generate new rate feedback process 96. Receive forward RM cell process 90 receives and processes RM cells initiated by the destination end station (i.e. the other side of the VC). A transmit backward RM cell process 94 formats and sends a reply to the forwarded RM cell received from the destination end station. Receive data cell process 92 simply receives and processes a data cell. During processing, the congestion information within the header is saved.

Multicast Domain Shaping

Traffic management unit 10 also implements multicast domain shaping in a simple and efficient manner, cutting down on unnecessary data traffic. As an analogy, it is well known that Ethernet networks are broadcast type networks, i.e. all devices on the network listen to every transmitted frame. Unicast and multicast frames transmitted on the network are heard by all devices. Each device must listen for and discard frames that are not addressed to it, thus wasting bandwidth. In switched Ethernet networks, unicast frames are seen only by destination; multicast and unknown frames are still seen by everyone on the network. Using a router, unicast Ethernet frames are seen only by the destination and multicast frames are seen only the previously defined Layer 3 group.

Using standard LAN emulation (LE), unicast transmissions are seen only by the destination whereas multicast transmissions are seen by the entire emulated LAN (ELAN). A distributed bus functions similarly as the standard LE but in this case, the bus is distributed. Similarly with ATM networks that include LAN emulation (LE) services that emulate Ethernet segments, the same problem of wasted bandwidth exists. A bus will emulate an Ethernet network by transmitting a multicast packet for each packet received destined for a device on the emulated LAN. A router, for example, would not send a multicast packet everywhere, in contrast to a bridge that would, however. A router performs its switching function by examining network level 3 data. The present invention performs multicast domain shaping by examining level 2 data (i.e. the media access control (MAC) layer). Rather than send multicast messages to everyone on the emulated LAN, multicast messages are only sent to certain MACs within a group. A group list is maintained that maps MAC identifications with ATM destinations (i.e. VCs). This lowers the amount of traffic resulting in less congested networks.

Using multicast domain shaping of the present invention, unicast data is seen by the destination, unknown/broadcast data is seen by the entire ELAN and multicast data is only seen by a user defined subset of users within the ELAN. The device of the present invention can implement a distributed bus, can send data directly to particular destinations and can send multicast data to a subset of users.

Mapping to ELANs

In the present invention, the mapping from Ethernet frames to ELANs is performed in traffic management unit 10. Using one or more lookup tables, traffic management unit 10, looks at the Layer 2 information content, such as protocol type, of a received frame from Ethernet workstation 32 (FIG. 4). Based on this information a mapping is performed and a VC group is chosen for the particular protocol being used. Thus, IP packets can be routed on a particular VC group, IPX packets on another VC group, etc.

While the invention has been described with respect to a limited number of embodiments, it will be appreciated that many variations, modifications and other applications of the invention may be made.

What I claim is:

1. In an Asynchronous Transfer Mode (ATM) edge device coupled to an ATM switch, a traffic management device communicating with said ATM switch, said ATM edge device including a data processor, said traffic management device comprising:

a traffic management processor coupled between said data processor and said ATM switch;

said traffic management processor providing resource management functionality for traffic flow between a first network device coupled via said data processor and a second network device coupled to said ATM switch;

a traffic management memory coupled to said traffic management processor, said traffic management memory storing a plurality of lookup tables for performing resource management (RM); and means for placing virtual circuits into a group in accordance with their output destination and performing feedback and rate calculations for all virtual circuits within said group utilizing traffic management feedback associated with a single virtual circuit within said group.

2. The device according to claim 1, further comprising means for starting said traffic management device in a predictable manner by employing a preliminary profile.

3. The traffic management device according to claim 1, further comprising means for calculating a new transmission rate as a function of the current transmission rate and the current level of network congestion.

4. The traffic management device according to claim 1, further comprising means for shaping multicast domains wherein media access layer (MAC) layer 2 based destination information located within a received message is examined and, based on said examination, said received message is sent only to the MAC destinations within a group list that contains a mapping between MAC identifications and ATM destination addresses.

5. A traffic management unit coupled between a cell data processor, and an Asynchronous Transfer Mode (ATM) switch, said traffic management unit located in a first end station, said first end station communicating with a second end station, said first end station having a plurality of virtual circuits, each virtual circuit having a destination, said traffic management unit comprising:

means for generating and transmitting Resource Management (RM) cells from said first end station to said second end station;

means for receiving and processing said RM cells returned from said second end station;

a plurality of lookup tables for holding traffic management related fixed data;

means for placing virtual circuits originating in said first end station into a group in accordance with their destination and performing feedback and rate calculations for all virtual circuits within said group utilizing traffic management feedback associated with a single virtual circuit within said group;

means for calculating a new transmission rate as a function of the current transmission rate and the current level of network congestion; and means for shaping multicast domains wherein media access layer (MAC) layer 2 based destination information located within a received message is examined and, based on said examination, said received message is sent only to the MAC destinations within a group list that contains a mapping between MAC identifications and ATM destination addresses.

6. The unit according to claim 5, further comprising means for starting said traffic management unit in a predictable manner and performing a method comprising the steps of:

booting said first end station utilizing a predetermined preliminary profile;

transmitting at least one RM cell to said second end station;

switching said first end station to use an operational profile if RM cells are returned to said first end station;

turning traffic management functions off, including the generation of RM cells, if no RM cells are returned but data cells are received by said first end station; and terminating said communication between said first end station and said second end station if no RM cells are returned and no data cells are received by said first end station.

* * * * *